(No Model.)
H. H. TYRRELL & C. M. HOLFORD.
DEVICE FOR OVERCOMING DEAD CENTERS.
No. 573,801.  Patented Dec. 22, 1896.
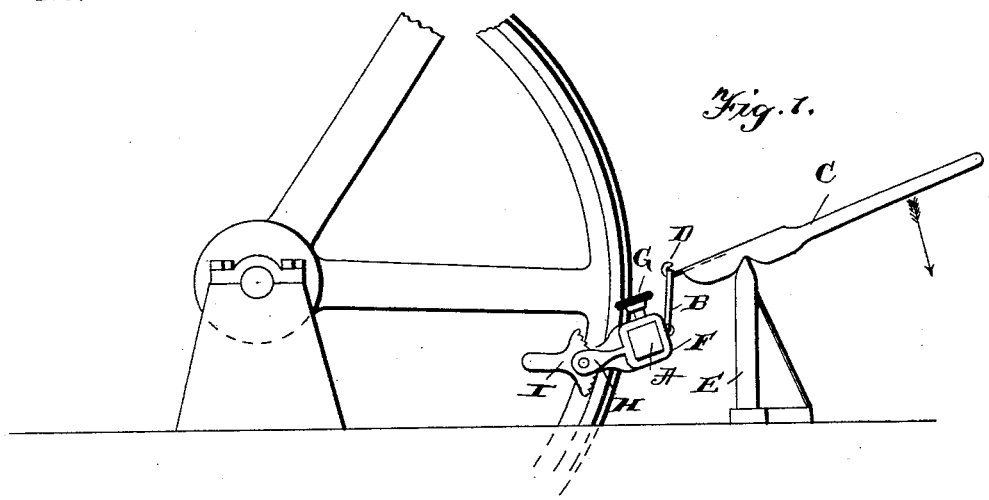
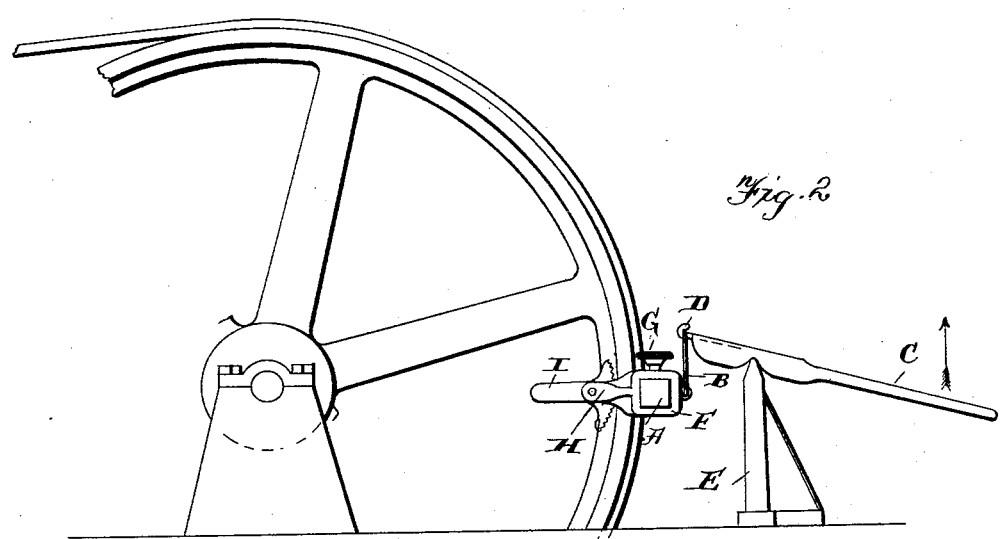
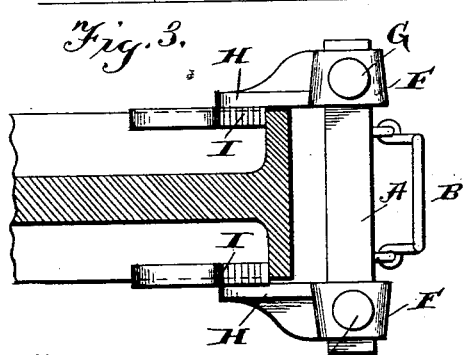
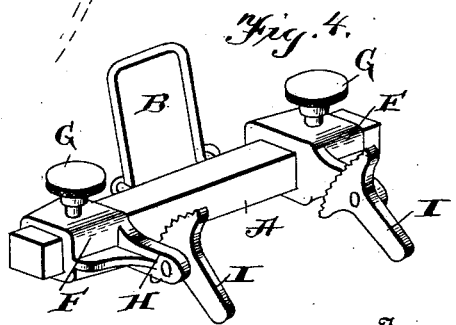
Witnesses
Geo. E. Fuch.
James W. Berans.
Inventors
H. H. Tyrrell
C. M. Holford
By Pattison and Nesbit
Attorneys
THE NORRIS PETERS CO., PHOTO-LITHO., WASHINGTON, D. C.

UNITED STATES PATENT OFFICE.

HERBERT H. TYRRELL AND CHARLES M. HOLFORD, OF SLATE RUN, PENNSYLVANIA.

DEVICE FOR OVERCOMING DEAD-CENTERS.

SPECIFICATION forming part of Letters Patent No. 573,801, dated December 22, 1896.

Application filed April 25, 1896. Serial No. 589,070. (No model.)

*To all whom it may concern:*

Be it known that we, HERBERT H. TYRRELL and CHARLES M. HOLFORD, of Slate Run, in the county of Lycoming and State of Pennsylvania, have invented certain new and useful Improvements in Devices for Overcoming Dead-Centers; and we do hereby declare the following to be a full, clear, and exact description of the invention, such as will enable others skilled in the art to which it pertains to make and use it, reference being had to the accompanying drawings, which form part of this specification.

This invention pertains to devices for overcoming dead-centers; and the object is to provide an appliance of simple and improved construction for effectively and quickly turning the pulley of an engine, so as to move the engine off the center.

The invention consists in the novel features of construction hereinafter fully described and claimed, and illustrated by the accompanying drawings, in which—

Figure 1 is an elevation of our device in position for moving the engine-pulley. Fig. 2 is a similar view showing the position of the device when about to be operated for securing a new hold upon the pulley. Fig. 3 is a plan view of the device in position. Fig. 4 is a detail perspective view of the same.

A designates a bar having secured to its outer side the bail B, and C designates a hand-lever, to the inner end of which the bail is removably secured by hook D. The lever is grooved upon its under side and has its fulcrum upon post E positioned in line with the band-wheel. Adapted to move on bar A are the clamps F, which are secured thereto in the desired adjustment by screws G. These clamps are adjustable freely over the ends of the bar and may be moved toward or away from each other upon the bar, as may be desired, in order to adjust the device to band-wheels varying in width. Arms H project forward from the clamps, so as to embrace the periphery of the wheel, and pivotally secured to the inner side of each arm is a dog I. These dogs are adapted to engage the inner periphery of the wheel, the engaging surfaces being rounded and serrated, so as to grip the same. The outer extremities of the dogs are weighted, or in other words are heavier than the serrated extremities, and hence have a tendency to pull downward, thus throwing the serrated ends upward, and this tendency causes the curved serrated ends of the dogs to automatically clutch the inner periphery of the band-wheel, as before stated, so that when bar A is elevated by the lever, as in Fig. 1, the dogs are securely clamped to the wheel-periphery, and thus the latter is turned.

One upward movement of the device may not be sufficient to move the engine off the center, and in such case the bar is simply lowered, as shown in Fig. 2, and owing to the weighted outer ends of the dogs they will not grasp the wheel when being moved downward, and hence the device may be quickly and easily adjusted for the new hold.

When the engine has been moved from the center, one or the other of the clamps is loosened and moved outward upon the bar and the adjusting device is quickly removed.

The improved device ("engine-jack," as we prefer to call it) is of the simplest possible construction and may be quickly and conveniently placed in position, and the work desired may be accomplished in the shortest possible time and by one man without other help.

Having thus fully described our invention, what we claim, and desire to secure by Letters Patent, is—

1. The combination of a vertically-movable carrier, and dogs pivotally secured thereto, said dogs being adapted at one end to engage the band-wheel and at their opposite ends counterweighted, whereby when the carrier is moved upward, the dogs will automatically engage the band-wheel but which will disengage the same when the carrier is moved downward, substantially as shown and described.

2. The combination of a vertically-movable carrier, and dogs pivotally secured thereto and at their inner ends adapted to engage the inner periphery of the band-wheel, the dogs being heavier at their outer ends than at their inner engaging ends, whereby when the carrier is moved upward the dogs will automatically engage the inner periphery of the band-wheel, but which will disengage therefrom when the carrier is moved downward for a new hold, substantially as shown and described.

3. The combination of a vertically-movable carrier, dogs pivoted thereto and at their inner ends rounded and serrated, said inner ends being arranged to engage the inner periphery of the band-wheel, the outer ends of the dogs being heavier than their inner engaging ends, whereby when the carrier is raised the dogs will automatically engage the inner periphery of the wheel and when lowered will disengage the same, substantially as shown and described.

4. In an appliance of the character described, the combination of a vertically-movable carrier adapted to be arranged in a plane parallel with the plane of the band-wheel journal, and devices adjustable longitudinally on said carrier and adapted to engage opposite edges of the band-wheel, substantially as shown and described.

5. The combination of a horizontally-arranged vertically-movable bar, clamps adjustable toward and away from each other on said bar, the arms extended from said clamps, and the wheel-grasping dogs secured to said arms and adapted to engage the periphery of the wheel, substantially as shown and described.

In testimony whereof we affix our signatures in presence of two witnesses.

HERBERT H. TYRRELL.
CHARLES M. HOLFORD.

Witnesses:
JOHN HILBORN,
WILLIAM E. ROLLINS.